US012687252B2

(12) United States Patent

Hawkins et al.

(10) Patent No.: US 12,687,252 B2

(45) Date of Patent: Jul. 21, 2026

(54) CORROSION RESISTANT TUBE AND METHOD OF MANUFACTURE

(71) Applicant: Indiana Tube Corporation, Evansville, IN (US)

(72) Inventors: Ron L. Hawkins, Evansville, IN (US); Joel M. Cunningham, Lafayette, IN (US); Rick J. Williamson, Evansville, IN (US); Rick L. Johnson, Mt. Vernon, IN (US); Randy E. Mohr, Newburgh, IN (US); Matthew A. Johnson, Evansville, IN (US); Daron W. McDonald, Evansville, IN (US)

(73) Assignee: Indiana Tube Corporation, Evansville, IN (US)

( * ) Notice: Subject to any disclaimer, the term of this patent is extended or adjusted under 35 U.S.C. 154(b) by 459 days.

(21) Appl. No.: 18/348,199

(22) Filed: Jul. 6, 2023

(65) Prior Publication Data

US 2024/0011596 A1      Jan. 11, 2024

Related U.S. Application Data

(60) Provisional application No. 63/358,568, filed on Jul. 6, 2022.

(51) Int. Cl.
| | |
|---|---|
| *F16L 58/08* | (2006.01) |
| *F16L 11/14* | (2006.01) |
| *F24F 1/34* | (2011.01) |

(52) U.S. Cl.
CPC .............. *F16L 58/08* (2013.01); *F16L 11/14* (2013.01); *F24F 1/34* (2013.01)

(58) Field of Classification Search
CPC . F16L 58/08; F16L 11/14; F16L 9/147; F16L 58/1054; F16L 9/17; F24F 1/34;

(Continued)

(56) References Cited

U.S. PATENT DOCUMENTS

| | | | | | |
|---|---|---|---|---|---|
| 1,896,411 | A | * | 2/1933 | Maskrey | B23K 20/04 |
| | | | | | 228/186 |
| 3,501,332 | A | * | 3/1970 | Buckman | C23C 18/206 |
| | | | | | 427/306 |

(Continued)

FOREIGN PATENT DOCUMENTS

| | | |
|---|---|---|
| CN | 110076526 B | 3/2021 |
| JP | 2017122281 A | 7/2017 |

(Continued)

OTHER PUBLICATIONS

B. Ogel, et al.; "Nickel Diffusion Coating on Austenitic Stainless Steels & Its Effect on Stress Corrosion Cracking"; Apr. 1999; pp. 87-90; 4 pgs.

(Continued)

*Primary Examiner* — Muhammad Ijaz

(74) *Attorney, Agent, or Firm* — Alix, Yale & Ristas, LLP

(57)      ABSTRACT

A corrosion resistant tube includes a tubular low carbon steel body having an inside surface and an outside surface, a corrosion resistant metal coating on the inside surface, a first corrosion resistant metal coating on the outside surface, a second corrosion resistant metal coating applied to the first corrosion resistant metal coating on the outside surface, and a polymer layer applied over the second corrosion resistant metal coating. A method of manufacturing a corrosion resistant tube, includes applying a corrosion resistant metal coating both sides of a strip of low carbon steel, forming the strip into a tube and welding the edges to form a tubular body. The weld is narrower at the inside surface than at the outside surface of the tubular body. The corrosion resistant metal coating on the inside surface is heated during welding and flows across and covers the weld.

20 Claims, 7 Drawing Sheets

(58) Field of Classification Search
CPC .............. B23K 2101/06; B23K 13/025; B23K
26/0093; B23K 26/262; B21C 37/08;
B21C 37/09
USPC ........................................................ 138/137
See application file for complete search history.

(56) References Cited

U.S. PATENT DOCUMENTS

| | | | |
|---|---|---|---|
| 4,071,641 A | 1/1978 | Susai | |
| 4,472,231 A | 9/1984 | Jenkins | |
| 4,515,992 A * | 5/1985 | Gupta | C09J 153/02 |
| | | | 428/447 |
| 5,567,528 A | 10/1996 | Toerner et al. | |
| 5,633,038 A | 5/1997 | Ruschau | |
| 6,976,510 B2 | 12/2005 | Campagna et al. | |
| 8,397,765 B2 * | 3/2013 | Jackson | B32B 15/18 |
| | | | 138/140 |
| 8,568,538 B2 | 10/2013 | Kerber | |
| 9,175,170 B2 | 11/2015 | Domes et al. | |
| 9,365,727 B2 | 6/2016 | Smith et al. | |
| 9,689,533 B2 | 6/2017 | Kenworthy et al. | |
| 9,695,322 B2 | 7/2017 | Gros et al. | |
| 9,791,091 B2 | 10/2017 | Yodogawa et al. | |
| 11,125,479 B1 | 9/2021 | Ingram | |
| 2002/0005223 A1 * | 1/2002 | Campagna | F16L 58/109 |
| | | | 138/146 |
| 2004/0001966 A1 * | 1/2004 | Subramanian | C23C 4/16 |
| | | | 428/678 |
| 2008/0292897 A1 * | 11/2008 | Ross | C23C 4/06 |
| | | | 427/451 |
| 2009/0114305 A1 * | 5/2009 | Roberts | F16L 58/16 |
| | | | 138/146 |
| 2014/0311613 A1 * | 10/2014 | Clements | F16L 11/24 |
| | | | 138/137 |
| 2016/0033059 A1 | 2/2016 | Fonte | |
| 2016/0047498 A1 * | 2/2016 | D'Hondt | B60K 15/04 |
| | | | 138/137 |
| 2016/0273683 A1 * | 9/2016 | Silveira E Silva | F16L 9/02 |
| 2017/0254560 A1 | 9/2017 | Alvise et al. | |
| 2018/0023163 A1 * | 1/2018 | Aratani | C21D 9/50 |
| | | | 138/171 |
| 2019/0184437 A1 * | 6/2019 | Okabe | B23K 11/34 |
| 2019/0217337 A1 | 7/2019 | Gujare et al. | |
| 2020/0041063 A1 * | 2/2020 | Kerin, Jr. | F16L 9/12 |
| 2020/0251742 A1 | 8/2020 | Anandan et al. | |
| 2020/0256485 A1 * | 8/2020 | McNeil | F16L 59/147 |
| 2020/0256487 A1 | 8/2020 | Taylor | |
| 2020/0370764 A1 | 11/2020 | Strickland | |
| 2021/0003290 A1 | 1/2021 | Ingram | |
| 2021/0031315 A1 * | 2/2021 | Singh | B21C 37/10 |
| 2022/0074525 A1 * | 3/2022 | Banerji | C23C 2/12 |
| 2024/0011596 A1 * | 1/2024 | Hawkins | F16L 58/08 |

FOREIGN PATENT DOCUMENTS

| | | |
|---|---|---|
| WO | 2010124596 A1 | 11/2010 |
| WO | 2018196622 A1 | 11/2018 |
| WO | 2019087648 A1 | 5/2019 |

OTHER PUBLICATIONS

M. T. Hannachi, et al.; "Effect of Heating of Steel Tubes by Induction at High Frequency"; Jul. 2018; Microwave Review; vol. 24, No. 1, pp. 23-27; 6 pgs.

Smith Tim et al: "Electroless nickel plating for corrosion and wear resistance", New Ironmaking Coating Conference Reports, Steel Times International, Apr. 2012, XP093085854, p. 31-31.

Arcelor Mittal et al, "High Strength Steels", Automotive World-wide, Aug. 2009, XP093085897, pp. 1-30.

PCT International Search Report and Written Opinion for International application No. PCT/US2023/069719 filed Jul. 6, 2023, Date of Mailing: Nov. 23, 2023, 18 pgs.

* cited by examiner

DUCTLESS MINI SPLIT

REFRIGERANT LINES

DUCTED HVAC

FURNACE

INDOOR COIL

26

20

22

REFIGERANT LINES

VRF DUCTLESS

24

24

24

20

22

28

10

10

28

DET. A (DIFFUSED DEPTH)
1 μ OR GREATER
(MICRON)

DET. A

DIFFUSED NICKEL COATING

14

42, 44

30

THIS AREA IS "LOW CARBON STEEL"

1 μ OR GREATER (MICRON)

5 μ OR GREATER (MICRON)

3 μ OR GREATER (MICRON)

THIS AREA IS "LOW CARBON STEEL"

TY&E TESTING AVERAGES

|  | COPPER TUBING | CR-LCS TUBING |
|---|---|---|
| TENSILE (PSI) | 38,261 | 40,442 |
| YIELD (PSI) | 28,129 | 29,455 |
| ELONGATION | 53.5% | 50.3% |

BENDING TEST - LBS FORCE

|  | COPPER TUBING | CR-LCS TUBING |
|---|---|---|
| GROUP 1 | 38,261 | 40,442 |
| GROUP 2 | 28,129 | 29,455 |

NOTE: "CR-LCS" CORROSION RESISTANT LOW CARBON STEEL

CORROSION RESISTANT TUBE AND METHOD OF MANUFACTURE

BACKGROUND

Tubing for heating ventilation and air conditioning (HVAC) split systems and heat pumps provide the refrigerant connections between the external HVAC compressor unit and the internal heat exchanger or blower unit. Copper tubing is the standard product in HVAC applications. Copper tubing has the required malleability allow the tubing to be bent to a desired shape and to allow the use of different compression type fittings to connect the tubing to the components of the HVAC system.

Corrosion resistance is also an important attribute of tubing used for containment of refrigerants and other potentially hazardous materials. HVAC systems include equipment that is installed outdoors, on rooftops and exposed to rain and weather. In coastal environments, salt laden fog or mist can accelerate corrosion of tubing, including the copper tubing commonly used to connect the outdoor components of HVAC systems to the indoor components. Because of this, the reliability of copper tubing cannot be guaranteed in locations within five miles of a coast.

There is a need for a cost-effective, corrosion resistant tubing for use in harsh environments.

There is a need for a cost-effective alternative to copper tubing for HVAC line sets, where the tubing has comparable yield, tensile strength and elongation to copper tubing.

There is a need for a cost-effective alternative to copper tubing that can be used in a flare union coupling.

SUMMARY OF THE INVENTION

The disclosed corrosion resistant tubing is a low carbon steel tubing product that provides internal and external corrosion resistance for up to 20 years in harsh environments. The low carbon steel tubing is selected and processed to have the same mechanical properties as copper tubing and has an average burst strength at least 40% higher than copper tubing.

A disclosed embodiment of a corrosion resistant tube includes a tubular low carbon steel body having an inside surface and an outside surface, a corrosion resistant metal coating on the inside surface, a first corrosion resistant metal coating on the outside surface, a second corrosion resistant metal coating applied to the first corrosion resistant metal coating on the outside surface, and a polymer layer applied over the second corrosion resistant metal coating. In an embodiment, the corrosion resistant metal coating on the inside surface has a first thickness greater than a second thickness of the first corrosion resistant metal coating on the outside surface of the tubular body. In an embodiment, the corrosion resistant metal coating on the inside surface is a diffused nickel coating having a thickness of 2 microns or greater. The diffused nickel coating on the inside surface may be diffused into the inside surface of the low carbon steel body to a depth of 1 micron or greater. In an embodiment, the first corrosion resistant metal coating on the outside surface of the tubular body is a diffused nickel coating having a thickness of 1 micron or greater.

In an embodiment, the corrosion resistant metal coating on the inside surface and the first corrosion resistant metal coating on the outside surface are diffused nickel coatings, the low carbon steel body is formed from a strip of low carbon steel sheet coated on both sides with the diffused nickel coating, the strip of low carbon steel sheet having longitudinal edges joined by a weld to form the low carbon steel body of the corrosion resistant tube, and the diffused nickel coating flows during welding to cover the weld on the inside surface. In an embodiment, a portion of the weld on the outside surface is removed, interrupting the diffused nickel coating on the outside surface, and the second corrosion resistant metal coating and polymer layers cover the interruption in the diffused nickel coating. The second corrosion resistant metal coating may comprise aluminum and zinc, with the second corrosion resistant metal coating having a thickness of 5 microns or greater. The second corrosion resistant metal coating may be approximately 95% aluminum and 5% zinc. The polymer layer may be an aluminum enriched epoxy coating having a thickness of 3 microns or greater.

The disclosure includes a method of manufacturing a corrosion resistant tube, said method comprising providing a strip of low carbon steel having top and bottom primary surfaces, and longitudinal edges connecting the top and bottom primary surfaces along longitudinal edges of said strip. A corrosion resistant metal coating is applied to at least the top and bottom primary surfaces of the strip. The strip is formed into a tube with the longitudinal edges of the strip adjacent to each other. The longitudinal edges of the strip are welded together to form a tubular body of the corrosion resistant tube, the tubular body having an inside surface and an outside surface corresponding to the top and bottom primary surfaces of the strip. The weld has an inside lateral span at the inside surface less than an outside lateral span of the weld at the outside surface of the tubular body. The corrosion resistant metal coating on the inside surface of the tubular body is heated during welding and flows across and covers the inside lateral span of said weld.

The method of manufacturing a corrosion resistant tube may include removing a portion of the weld extending radially beyond the outside surface of the tubular body and applying a second corrosion resistant metal coating to the outside surface of the tubular body over the first corrosion resistant metal coating, the second corrosion resistant metal coating spanning and covering the region of the outside surface where the portion of the weld is removed. The method of manufacturing a corrosion resistant tube may include applying the corrosion resistant metal coating to one of said top or bottom principal surfaces to a first thickness, applying the corrosion resistant metal coating to the other of said top or bottom principal surfaces to a second thickness greater than the first thickness, and orienting the strip so that the principal surface to which the corrosion resistant metal coating is applied to the second thickness forms the inside surface of the tubular body. The step of applying a corrosion resistant metal coating may include applying a nickel coating to at least the top and bottom primary surfaces of the low carbon steel strip, and heating the nickel coating to approximately the annealing temperature of the low carbon steel, causing the nickel coating to diffuse into the top and bottom primary surfaces of the strip, the nickel coating diffusing into the top and bottom primary surfaces to a depth of 1 micron or greater.

A second corrosion resistant metal coating applied over the first corrosion resistant metal coating on the outside of the tubular body may include aluminum and zinc. A polymer layer may be applied over the second corrosion resistant metal coating on the outside of the tubular body. The tubular body may be cold worked to a finished diameter and annealed after cold working.

DETAILED DESCRIPTION

Figure 1:
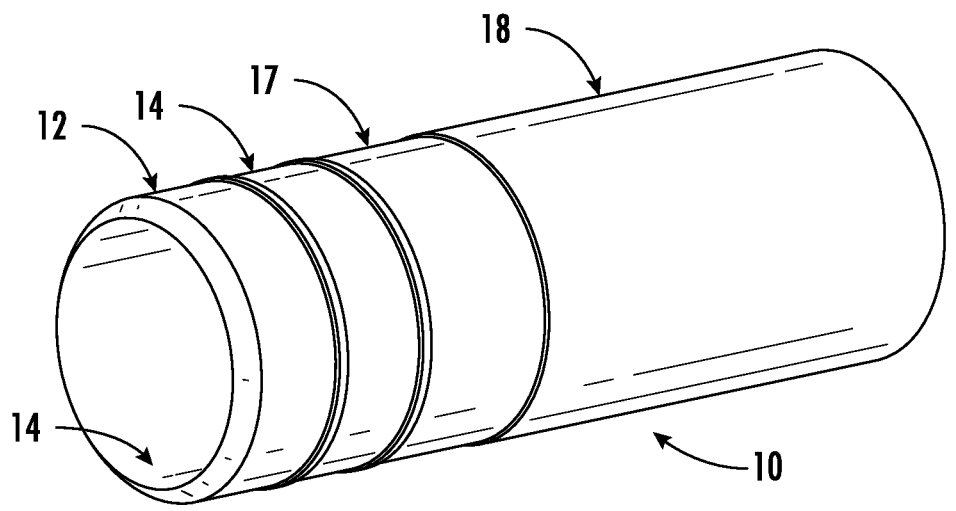
FIG. 1 is a perspective view of an embodiment of a corrosion resistant tube according to aspects of the disclosure.
Figures 9, 10:
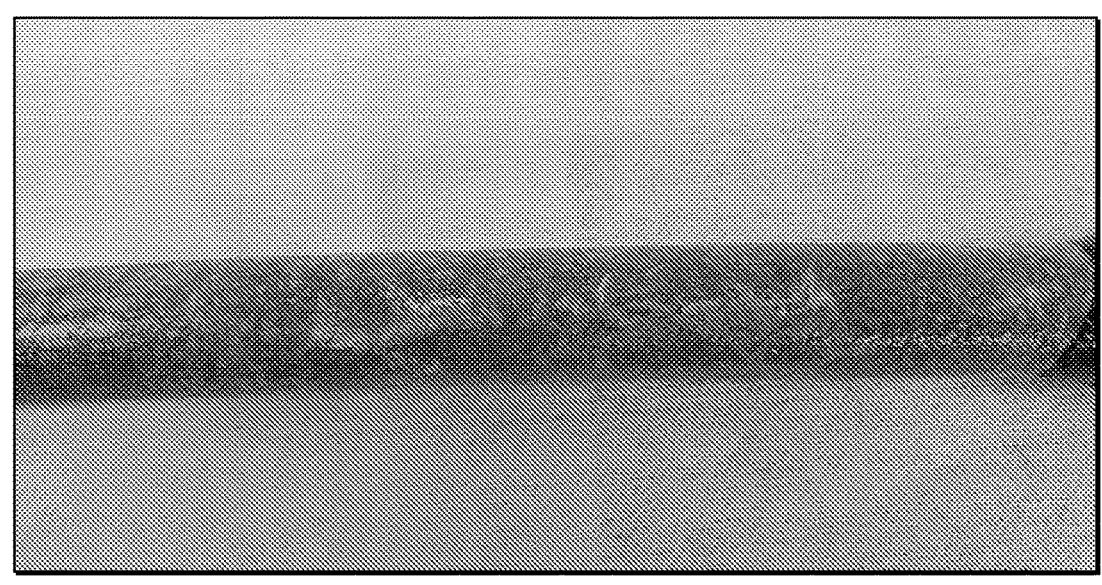
FIG. 9 is a table comparing the mechanical properties of a corrosion resistant tube according to aspects of the disclosure to a prior art soft copper tube.
FIG. 10 is a photograph of the disclosed corrosion resistant tube after 4,080 hours of exposure to salt spray according to the test procedure set forth in ASTM B117.

FIG. 1 illustrates an exemplary embodiment of a corrosion resistant tube 10 according to aspects of the disclosure. The disclosed corrosion resistant tube 10 is constructed of a tubular body 12 of low carbon steel having comparable yield, tensile strength and elongation properties of copper tubing after all processing and coating steps are completed. Cold rolled low carbon steel suitable for use in forming the tubular body 12 of the disclosed corrosion resistant tube 10 is selected and processed to produce a highly corrosion resistant tube 10 that will feel and function substantially identically to copper tube when used in applications such as heating HVAC line sets. Although the disclosed corrosion resistant tube 10 is discussed primarily in the context of HVAC refrigerant line sets, the disclosed corrosion resistant tube 10 may be a direct replacement for copper tube used in oil, gas, air, and water systems. In all applications where soft copper tube is used, the yield, tensile strength and elongation properties of the copper tube allow it to be formed in the field into shapes without kinking or cracking. Soft copper tube is seamless and has uniform inside and outside surfaces that allow it to be flared and used in flared union couplings. FIG. 9 is a chart comparing the yield, tensile strength, elongation and burst strength of the disclosed corrosion resistant tubing with that of standard soft copper tubing. The yield, tensile strength and elongation of the disclosed corrosion resistant tubing is comparable to that of standard soft copper tubing.

Figure 2A:
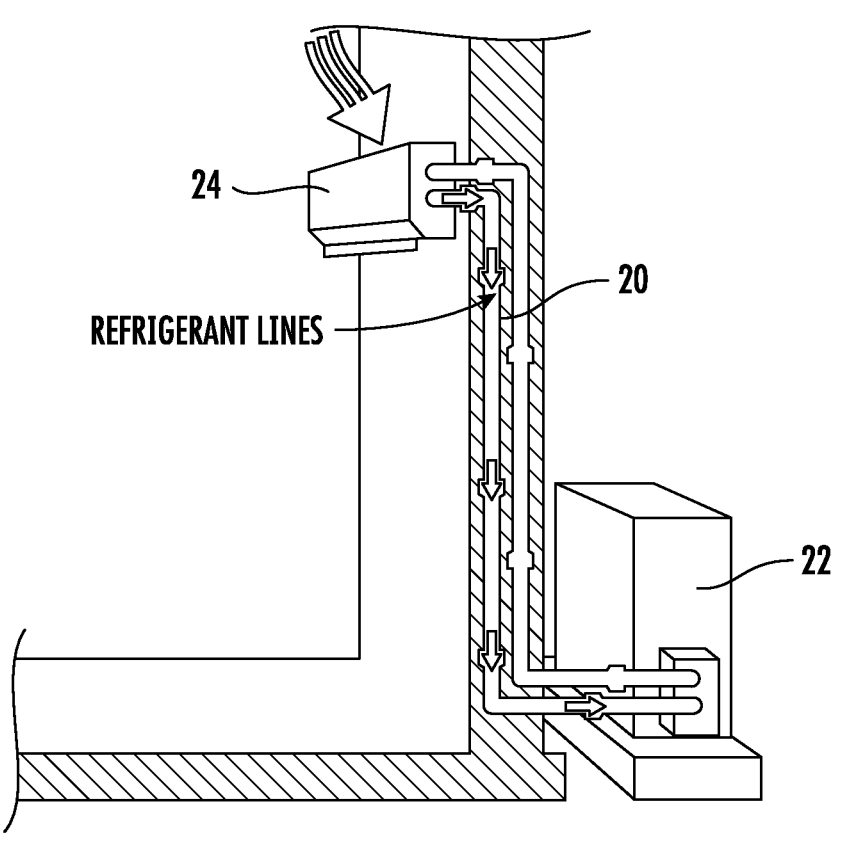
FIG. 2A illustrates a representative use for an HVAC line set extending between an outdoor unit or condenser and an indoor unit or evaporator in a ductless mini split air conditioner or heat pump.
Figure 2B:
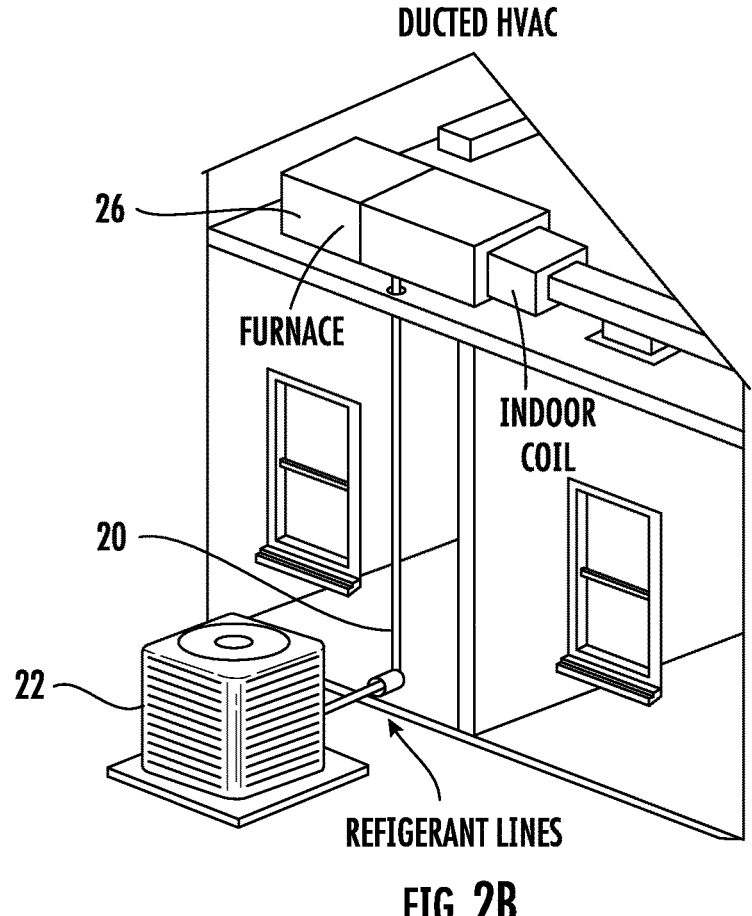
FIG. 2B illustrates a representative use for an HVAC line set extending between an outdoor unit or condenser and an indoor unit or evaporator air handler in a ducted HVAC system.
Figure 2C:
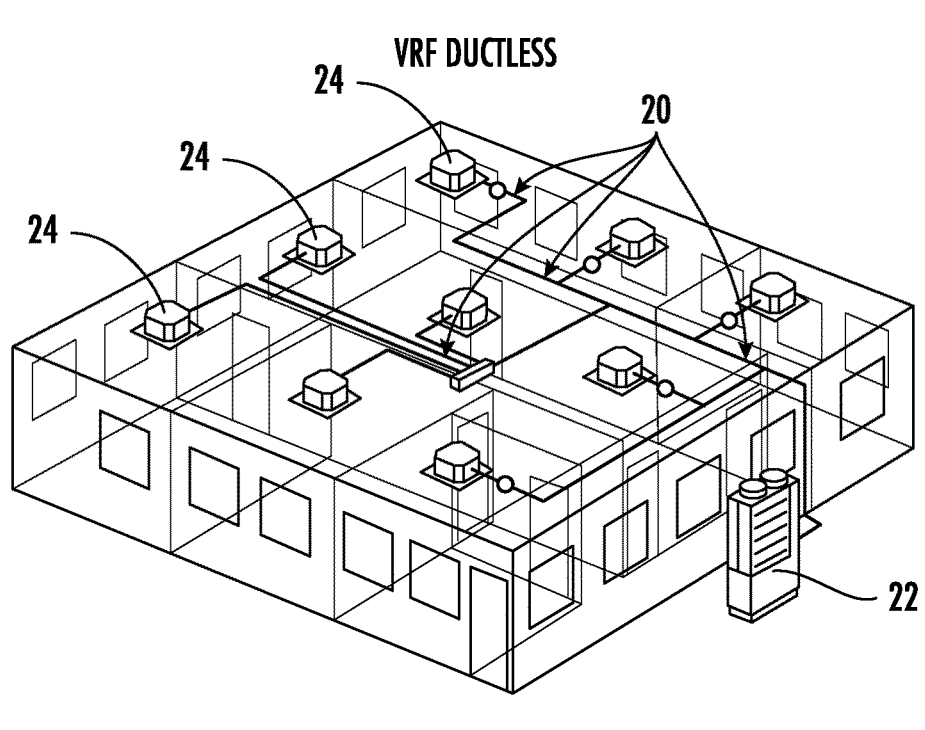
FIG. 2C illustrates a representative use for HVAC line sets extending between an outdoor unit and a plurality of indoor units in a variable refrigerant flow (VRF) ductless HVAC system.

FIG. 2A illustrates a common use environment for an HVAC refrigerant line set 20 with two refrigerant lines extending between an outdoor heat pump or condenser 22 and an indoor heat exchanger or evaporator 24 of a ductless mini split system. FIG. 2B illustrates an HVAC line set 20 extending between an outdoor unit or condenser 22 and an indoor air handler 26 in a ducted HVAC system. FIG. 2C illustrates multiple HVAC line sets 20 extending between an outdoor unit 22 and multiple indoor units 24 in a variable refrigerant flow (VRF) ductless HVAC system. In each case, the line set 20 includes outgoing and return refrigerant lines that must be bent to change direction several times as they pass through exterior and interior walls of the structure. These bends are made in the field by technicians using simple tools or by hand. In addition, at each end, the refrigerant line set must form a sealed connection to the components 22, 24, 26 of the HVAC system using industry standard fittings. Extended length tubing runs may require sealed connections along the length of the refrigerant lines. The portions of the line sets 20 extending outside the structure are exposed to the ambient environment. The mechanical properties of tubing used for HVAC refrigerant line sets 20 must allow technicians to make the bends and connections using existing methods and couplings. As shown in FIG. 9 and field testing, the disclosed corrosion resistant tube 10 meets these requirements and is suitable as a direct replacement for soft copper tube, but with substantially greater pressure handling at each tube diameter, lower cost, and with improved corrosion resistance. The improved corrosion resistance allows the disclosed corrosion resistant tube 10 to be used in environments where copper tube is known to fail, such as coastal environments exposed to salt fog.

Figures 3, 4:
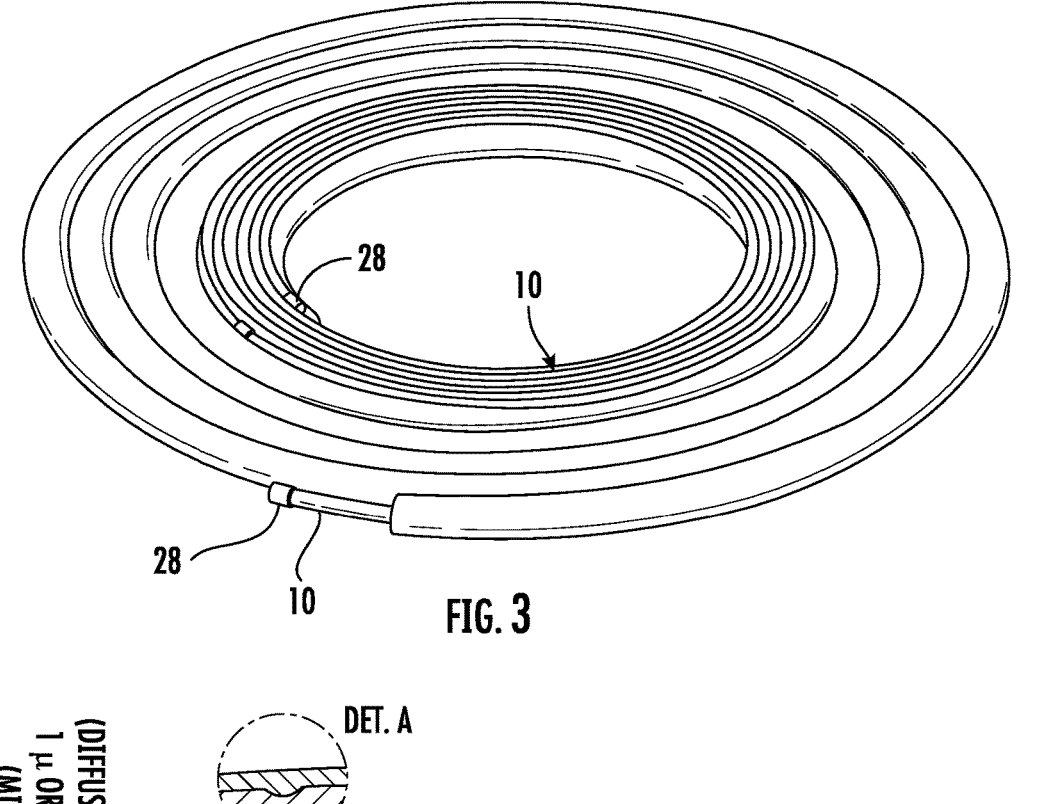
FIG. 3 illustrates a representative refrigerant line set constructed of the disclosed corrosion resistant tube.
FIG. 4 is an enlarged sectional view through a surface of the low carbon steel body of the disclosed corrosion resistant tube showing a representative corrosion resistant nickel coating.

FIG. 3 illustrates an HVAC refrigerant line set 20 constructed of the disclosed corrosion resistant tube 10, showing caps 28 used to close the open ends of the tube 10 between manufacture and installation.

Figures 7, 8:
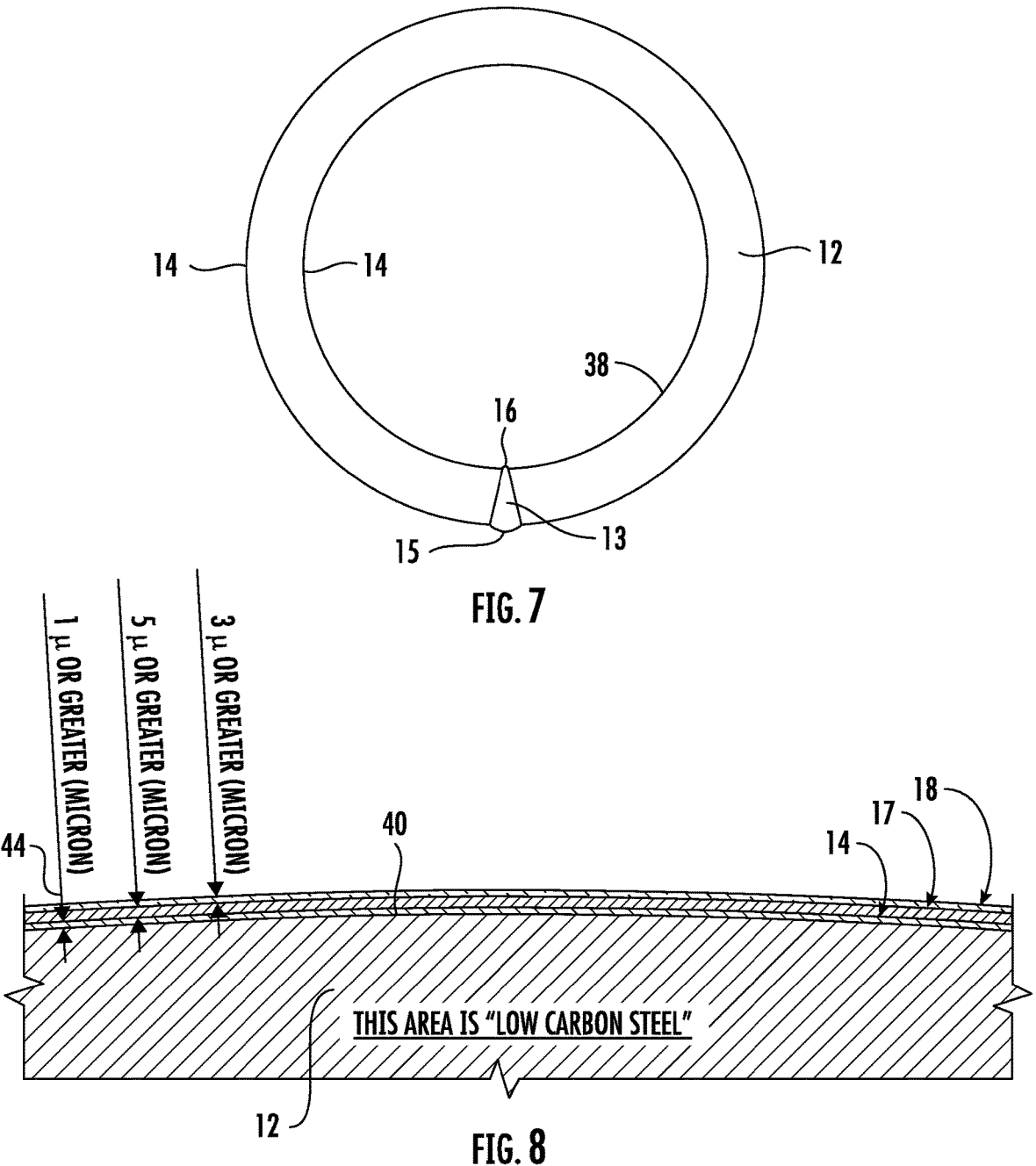
FIG. 7 is an enlarged sectional view through an embodiment of a corrosion resistant tube schematically representing the weld.
FIG. 8 is an enlarged sectional view of the outside surface of an embodiment of corrosion resistant tube according to aspects of the disclosure.
Figure 11:
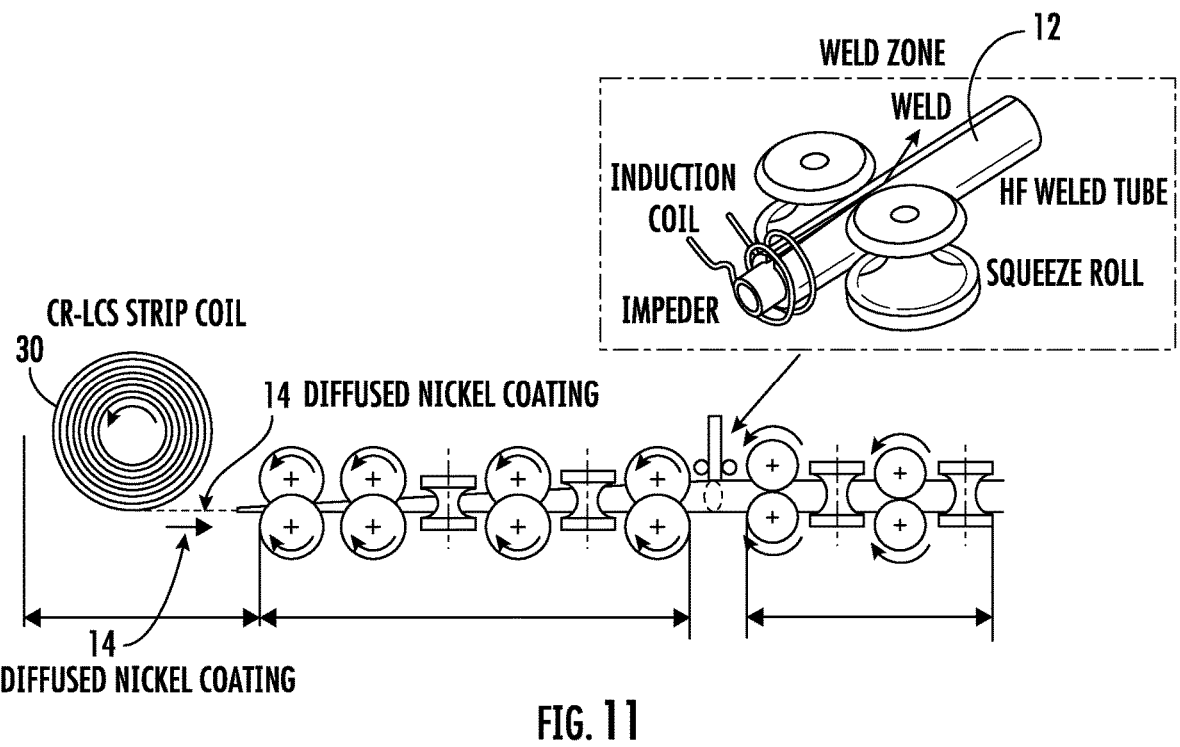
FIG. 11 illustrates roll forming a strip of low carbon steel into a tube and welding the tube to form a tubular body of the corrosion resistant tube according to aspects of the disclosure.
Figure 12:
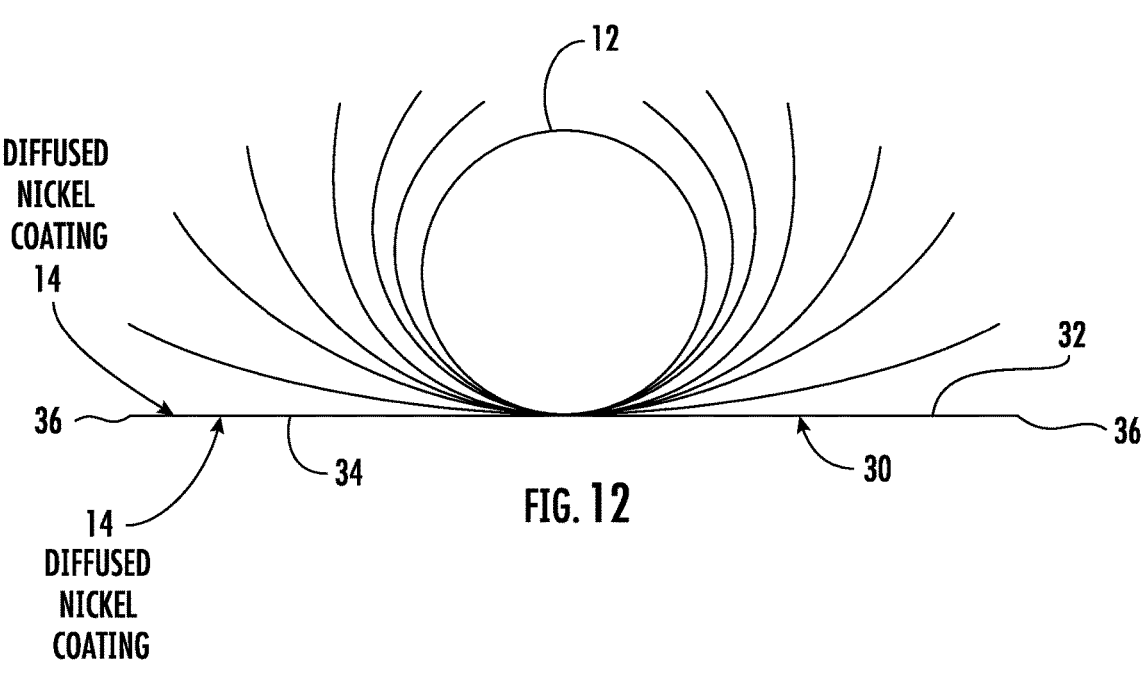
FIG. 12 illustrates steps transitioning a flat strip into a tube in roll forming equipment such as that illustrated in FIG. 11.

As shown in FIGS. 11 and 12, low carbon steel is formed into a strip 30 having a top primary surface 32 and a bottom primary surface 34 connected by longitudinal edges 36. The strip 30 is coated with a first corrosion resistant metal coating 14 on both the top primary surface 32 and the bottom primary surface 34 of the strip 30. The coating process may also cover the longitudinal edges 36 of the strip with the first corrosion resistant metal coating 14. The first corrosion resistant metal coating 14 must have excellent adhesion to the low carbon steel, so the corrosion metal resistant coating remains intact during subsequent processing of the strip 30 to form the tubular body 12 of the disclosed corrosion resistant tube 10. To form the tubular body 12 of the tube 10, the strip is moved through a series of roll tooling illustrated in FIG. 11 that form the strip into a cylindrical shape in several steps 1-5 shown. The roll tooling brings the longitudinal edges 36 of the strip adjacent to each other. The longitudinal edges 36 of the strip are welded together to form the tubular body 12 of the corrosion resistant tube 10. According to aspects of the disclosure, the weld 13 is formed primarily on the outside of the tubular body 12, with a lateral and radial dimension of the weld being greater on the outside surface of the tubular body 12 than the lateral and radial dimension 16 on the inside surface of the tubular body as shown in FIG. 7.

Local heating of the longitudinal edges 36 of the strip that occurs during welding of the tubular body 12 also heats the first corrosion resistant metal coating 14 on what becomes the inside surface 38 of the tubular body 12. The weld 13 may be produced by induction heating the longitudinal edges 36 of the low carbon steel strip 30 or laser welding. In a preferred embodiment illustrated in FIG. 11, the longitudinal edges 36 of the low carbon steel strip 30 are inductively heated and forced together to form the weld 13. The weld 13 has a tapered configuration shown in FIG. 7, with a narrow lateral dimension 16 on the inside surface 38 of the tubular body 12. According to aspects of the disclosure, the first corrosion resistant metal coating 14 reaches a temperature where the metal coating can flow or diffuse across the narrow lateral dimension 16 of the weld 13 on the inside surface 38 of the tubular body 12, providing a corrosion resistant metal coating 14 over the entire inside surface 38 of the tubular body 12. Figure is an enlarged sectional view of an embodiment of corrosion resistant tube 10 showing a diffused nickel coating extending across the weld 13 on an inside surface 38 of the tubular body 12. Since the weld 13 has a larger lateral span 15 on the outside of the tubular body 12, the corrosion resistant metal coating 14 on the outside of the tubular body 12 is necessarily interrupted by the weld 13. According to aspects of the disclosure, the portion of the weld 13 that protrudes radially beyond the outside circumference of the tubular body 12 is removed so the tubular body 12 has a uniform, cylindrical outside surface 40.

Figure 6:
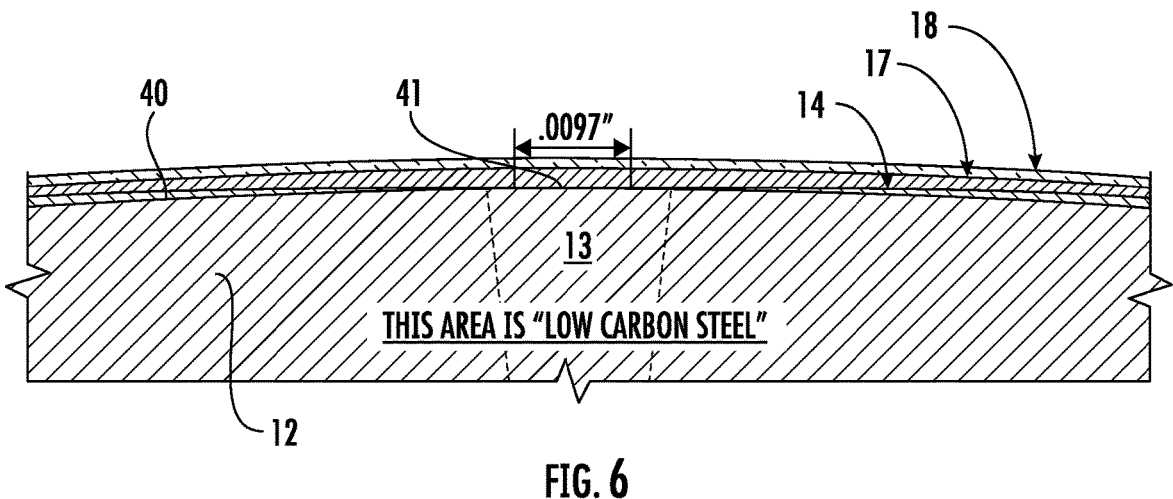
FIG. 6 is an enlarged sectional view through an area where the weld is removed from an outside surface of an embodiment of the corrosion resistant tube according to aspects of the disclosure.

FIG. 6 is an enlarged sectional view of the tubular body 12 of the corrosion resistant tube 10 where the radially protruding portion of the weld 13 is removed. Welding and removal of the protruding portion of the weld results in longitudinal interruption 41 of the corrosion resistant metal coating 14 on the outside of the tubular body 12. FIG. 6 illustrates where the first corrosion resistant metal coating 14 is removed over a portion of the outside surface measuring 0.0097" measured around the circumference of the tubular body 12. According to aspects of the disclosure, a second corrosion resistant metal coating 17 is applied to the tubular body 12, covering the longitudinal interruption 41 of the first corrosion resistant metal coating 14. The second corrosion resistant metal 17 coating ensures the resulting tube 10 is corrosion resistant over its entire outside surface 40. In some embodiments, a final corrosion resistant polymer layer 18 is applied to the second corrosion resistant metal coating 17 on the outside surface of the tubular body 12. FIG. 8 is an enlarged sectional view of an embodiment of the corrosion resistant tube 10 showing the second corrosion resistant metal coating 17 and the final polymer layer 18 according to aspects of the disclosure.

One example of a suitable corrosion resistant metal coating 14 applied to both major surfaces 32, 34 of the low carbon steel strip 30 from which the tubular body 12 is constructed is a diffused nickel coating. Nickel coatings may be applied to the low carbon steel strip 30 by using electroplating or electroless (chemical) plating methods. The coated low carbon steel is then heated to a temperature approximately equal to an annealing temperature for the low carbon steel, which causes the nickel in the coating to diffuse into the surface of the low carbon steel to a depth of at least 1 micron and some of the iron in the low carbon steel to diffuse into the nickel coating. FIG. 4 is an enlarged view of the surface of the low carbon steel strip 30 and a nickel coating 14 that has been heated to diffuse the nickel coating with the low carbon steel, forming a very strong bond between the coating 14 and the steel. This mutual diffusion forms a diffusion layer alloy with high nickel content at the interface of the nickel coating and the low carbon steel. The nickel top layer and nickel rich diffusion layer provide very strong corrosion resistance sufficient to withstand ASTM B117 salt spray (fog) testing in environments where copper tubing cannot meet this testing requirement. Diffusion of the nickel coating and low carbon steel increase adhesion of the nickel coating to the low carbon steel. Further, heating to promote diffusion between the nickel coating 14 and the low carbon steel substrate improve the ductility of the nickel coating 14. The combination of mutual diffusion, high adhesion and improved ductility result in a corrosion resistant coating that will remain intact throughout the entire process of forming a tube from a strip 30 of nickel coated low carbon steel, welding the edges 36 of the strip 30 to form a tube, cold working the tube to its final outside diameter and wall thickness, and annealing the finished tubular body 12. Strong adhesion of the corrosion resistant metal coating 14 to the tubular body 12 further ensure that the coating 14 will remain intact when the corrosion resistant tube 10 is formed and connected in the field.

Figure 5:
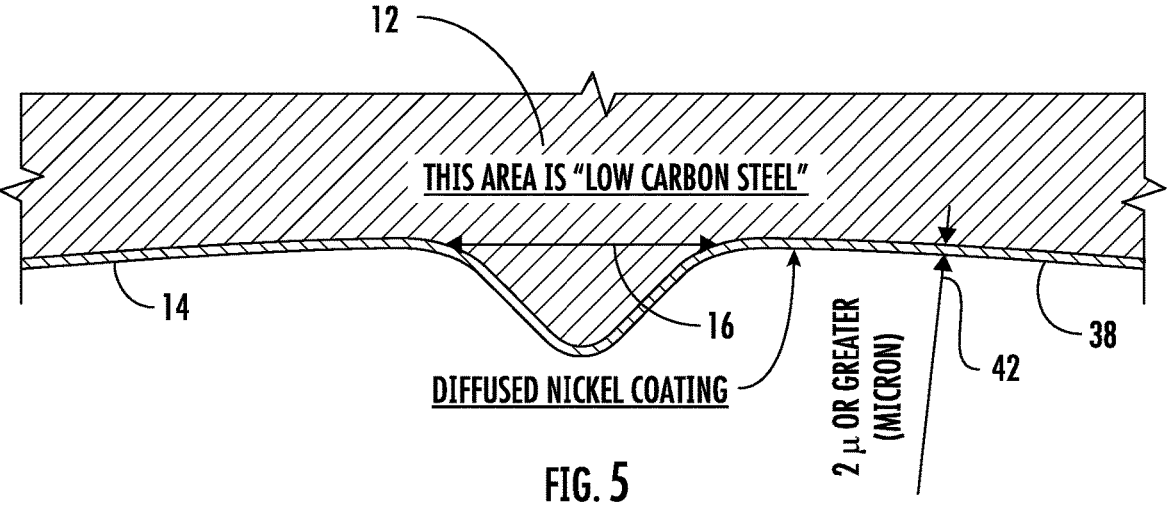
FIG. 5 is an enlarged sectional view through the weld zone of an embodiment of a corrosion resistant tube according to aspects of the disclosure.

The corrosion resistant metal coating 14 may be applied to a greater thickness 42 to the primary surface of the low carbon steel strip 30 that becomes the inside surface 38 of the corrosion resistant tube 10. The corrosion resistant metal coating 14 may be applied to a thickness 42 of 2 microns or greater to the primary surface of the strip 30 that becomes the inside of the corrosion resistant tube 10 and to a thickness 44 of 1 micron or greater to the primary surface of the strip 30 that becomes the outside surface 40 of the corrosion resistant tube 10. The corrosion resistant metal coating 14 on the inside surface 38 of the corrosion resistant tube 10 is applied to a thickness 42 that allows the corrosion resistant metal coating 14 to flow when heated during welding to cover and protect the weld 13 along the inside surface of the corrosion resistant tube 10 as shown in FIG. 5. The corrosion resistant metal coating 14 is selected and applied in a manner that, in combination with the narrow lateral span 16 of the weld 13 on the inside surface 38 of the tubular body 12, produces this unexpected "healing" of the coating 14 on the inside surface 38 of the tube 10 during welding. The corrosion resistant metal coating 14 on the inside surface of the tube 10 may also diffuse with the weld 13 during later annealing of the tube 10 after the tubular body 12 is cold worked to its finished dimensions.

When the tubular body 12 has been cold worked and annealed to its finished dimensions and the desired yield, tensile strength and elongation, the second corrosion resistant metal coating 17 is applied to the outside surface of the tubular body 12. An example of a second corrosion resistant metal coating 17 is a coating comprising aluminum and zinc. In one form, the second corrosion resistant metal coating 17 is 95% zinc and 5% aluminum. The surface of the first corrosion resistant metal coating 14 may be treated to improve adhesion of the second corrosion resistant metal coating 17, which is applied to a thickness of 5 microns or greater. The second corrosion resistant metal coating 17 covers and protects the interruption 41 of the outside surface of the tubular body 12 where the weld 13 interrupts the first corrosion resistant metal coating 14.

According to aspects of the disclosure, the first corrosion resistant metal coating 14 is applied to the tubular body 12 before the tubular body 12 is cold worked to its final outside diameter and wall thickness. The corrosion resistant metal coating 14 is adhered strongly to the underlying low carbon steel and is not cracked or separated from the tubular body 12 during roll reduction of the tubular body 12 to its finished dimensions. After the tubular body 12 is cold worked to its finished dimensions, the tubular body 12 is heated to anneal the tubular body 12 and restore its ductility. This final annealing step may further enhance diffusion of the first corrosion resistant metal coating 14 with the low carbon steel on the inside and outside surfaces 38, 40 of the tubular body 12. The approximate mechanical properties of an embodiment of the corrosion resistant tube 10 are tensile strength of 40,000 psi, a yield strength of 29,000 psi and an elongation of 50.3%.

Corrosion resistant metal coatings 14, 17 suitable for use in the disclosed corrosion resistant tube 10 include, but are not limited to aluminum, zinc, nickel, alloys of aluminum and zinc, Chromium, Zi-Ni, Aluminized, Galvalume®, Galvanized, Magneliso, Aluminum Chromate, or other Chromate conversion coatings. As will be appreciated by those skilled in the art, the properties of the selected corrosion resistant metal coatings 14, 17 will likely influence process parameters such as the thickness of the coatings, heating required to diffuse the first metal coating 14 with the low carbon steel, surface treatments between application of coatings, etc.

In one embodiment, the corrosion resistant tube 10 includes a polymer layer 18 applied over the outside of the second corrosion resistant metal coating 17. One suitable polymer layer is aluminum-enriched epoxy. Epoxies are thermosetting polymers that can be applied in a liquid state and solidified by cross-linking. Epoxies applied in a liquid state coat the outside surface of the corrosion resistant tube 10 and adhere to the second corrosion resistant metal coating 17. An aluminum-enriched enriched epoxy has good adhesion with a second corrosion resistant metal coating 17 containing aluminum. Alternative polymer layers may include a plastic sheath.

Corrosion resistant tube 10 according to the disclosure meets or exceeds the following industry standard: ASTM: B117, D1654, D2247, D1735, D3359, D714, and G44, GMW: 3172, 14872, and SAE J2334 cycle testing. Figure is a photograph of a sample of a corrosion resistant tube after exposure to salt and humidity under the conditions set forth in ASTM B117 for 4,080 hours. 100 hours of exposure under the conditions of ASTM B117 is estimated to be equivalent of one year of exposure to the environment.

Corrosion resistant tube 10 according to the disclosure meets or exceeds the following standards for mechanical performance, pressure handling and/or burst resistance: (ASTM B280, ASTM B1003, A513), (SAE J526, J356), and UL 207. UL 207 requires refrigerant tubing be rated for three times (3×) the system design pressure on the low-pressure side and five times (5×) the system design pressure on the high-pressure side. Average HVAC systems operate at 400 psi on the high-pressure side and the disclosed corrosion resistant tube 10 is tested to ten times (10×) or 4,000 psi for pressure decay with an ultimate burst pressure average of 7,000 psi—after 4,000 hours of salt spray testing under ASTM B117. Ultimate burst pressure for the disclosed corrosion resistant tube 10 is greater than 7,000 psi, or 40% higher than 4,000 psi.

As shown in FIG. 3, an HVAC line set 20 constructed of the disclosed corrosion resistant tube 10 includes at least two tubes 10 connecting the system component outside of a building with one or more system components inside the building. The tubes 10 circulate refrigerant in a loop from the outside component to the inside component(s) as is known in the art with one tube being insulated as shown in FIG. 3. The tubes 10, insulation, and sometimes electrical conductors are bundled together in what is known as a line set that is sold with the HVAC system. The line set 20 needs to be flexible so it can be bent without tools into shapes that can extend through openings in crawl spaces, basements, ceilings, and interior/exterior walls. It is important that the tubes 10 in a line set have a predictable malleability and will bend without kinking and without fatigue or cracking so the flow and containment of refrigerant is not impaired. The disclosed corrosion resistant tube 10 is constructed of low carbon steel tube selected and processed to bend and form in a manner substantially identical to the existing prior art copper tube used for HVAC line sets. The disclosed corrosion resistant tube is produced in outside diameters and surface finishes that allow them to be used with the connection systems currently used to connect copper tubes, but with a reduced tendency to kink and with a far greater burst pressure, allowing the disclosed corrosion resistant tube 10 to be used in future HVAC systems with higher operating pressures. The disclosed corrosion resistant tube 10 has approximate mechanical properties including a tensile strength of 40,000 psi, a yield strength of 29,000 psi and elongation of 50.3% that match the mechanical properties of copper tubing used for line sets.

HVAC line sets are typically sold with HVAC equipment and are equipped with caps 28 covering the ends of the tubes 10 as shown in FIG. 3. The caps 28 prevent foreign matter or moisture from entering the tubes 10 before they are connected to the HVAC equipment and charged with refrigerant. However, it is known that these caps 28 can be lost before the line sets 20 are used. In such a case, it is possible for moisture to enter the tubes 10 and begin corrosion of the tube. The disclosed corrosion resistant tube 10 is protected against such an event by the corrosion resistant metal coating on the inside surface of the tube.

What is claimed:

1. A corrosion resistant tube comprising:
   a tubular low carbon steel body having an inside surface and an outside surface;
   a corrosion resistant metal coating on the inside surface;
   a first corrosion resistant metal coating on the outside surface;
   a second corrosion resistant metal coating applied to the first corrosion resistant metal coating; and
   a polymer layer applied over the second corrosion resistant metal coating,
   wherein the corrosion resistant metal coating on the inside surface has a first thickness greater than a second thickness of the first corrosion resistant metal coating on the outside surface.

2. The corrosion resistant tube of claim 1, wherein the corrosion resistant metal coating on the inside surface is a diffused nickel coating having a thickness of 2 microns or greater.

3. The corrosion resistant tube of claim 2, wherein the first corrosion resistant metal coating on the outside surface is a diffused nickel coating having a first thickness of 1 micron or greater.

4. The corrosion resistant tube of claim 2, wherein the diffused nickel coating on the inside surface is diffused into the inside surface of the low carbon steel body to a depth of 1 micron or greater.

5. The corrosion resistant tube of claim 1, wherein the corrosion resistant metal coating on the inside surface and the first corrosion resistant metal coating on the outside surface are diffused nickel coatings, the low carbon steel body is formed from a strip of low carbon steel sheet coated on both sides with the diffused nickel coating, the strip of low carbon steel sheet having longitudinal edges joined by a weld to form the low carbon steel body of the corrosion resistant tube, and the diffused nickel coating flows during welding to cover the weld on the inside surface.

6. The corrosion resistant tube of claim 5, wherein a portion of the weld on the outside surface is removed, interrupting the diffused nickel coating on the outside surface, said second corrosion resistant metal coating and polymer layers covering the interruption in the diffused nickel coating.

7. The corrosion resistant tube of claim 6, wherein the second corrosion resistant metal coating is approximately 95% aluminum and 5% zinc.

8. The corrosion resistant tube of claim 1, wherein said second corrosion resistant metal coating comprises aluminum and zinc having a thickness of 5 microns or greater.

9. The corrosion resistant tube of claim 1, wherein said polymer layer is an aluminum enriched epoxy coating having a thickness of 3 microns or greater.

10. A corrosion resistant tube comprising:
a tubular low carbon steel body having an inside surface and an outside surface;
a corrosion resistant metal coating on the inside surface;
a first corrosion resistant metal coating on the outside surface;
a second corrosion resistant metal coating applied to the first corrosion resistant metal coating; and
a polymer layer applied over the second corrosion resistant metal coating,
wherein the low carbon steel body has approximate mechanical properties including a tensile strength of 40,000 psi, a yield strength of 29,000 psi, and elongation of about 50.3%.

11. The corrosion resistant tube of claim 10, wherein the corrosion resistant metal coating on the inside surface has a first thickness greater than a second thickness of the first corrosion resistant metal coating on the outside surface.

12. The corrosion resistant metal tube of claim 11, wherein the corrosion resistant metal coating on the inside surface is a diffused nickel coating having a thickness of 2 microns or greater.

13. The corrosion resistant metal tube of claim 10, wherein the corrosion resistant metal coating on the inside surface and the first corrosion resistant metal coating on the outside surface are diffused nickel coatings, the low carbon steel body is formed from a strip of low carbon steel sheet coated on both sides with the diffused nickel coating, the strip of low carbon steel sheet having longitudinal edges joined by a weld to form the low carbon steel body of the corrosion resistant tube, and the diffused nickel coating flows during welding to cover the weld on the inside surface.

14. A method of manufacturing a corrosion resistant tube, said method comprising:
providing a strip of low carbon steel, said strip having top and bottom primary surfaces, and longitudinal edges connecting the top and bottom primary surfaces along longitudinal edges of said strip;

applying a corrosion resistant metal coating to at least the top and bottom primary surfaces of said strip;
forming the strip into a tube with the longitudinal edges of the strip adjacent to each other; and
welding the longitudinal edges of the strip to form a tubular body of the corrosion resistant tube, said tubular body having an inside surface and an outside surface corresponding to the top and bottom primary surfaces, said weld having an inside lateral span at said inside surface less than an outside lateral span of said weld at said outside surface,
wherein the corrosion resistant metal coating on the inside surface of the tubular body is heated during welding and flows across and covers the inside lateral span of said weld.

15. The method of manufacturing a corrosion resistant tube of claim 14, comprising:
removing a portion of the weld extending radially beyond the outside surface of said tubular body; and
applying a second corrosion resistant metal coating to the outside surface of said tubular body over said corrosion resistant metal coating, said second corrosion resistant metal coating spanning and covering the region of the outside surface where the portion of the weld is removed.

16. The method of manufacturing a corrosion resistant tube of claim 15, wherein said second corrosion resistant metal coating comprises aluminum and zinc.

17. The method of manufacturing a corrosion resistant tube of claim 15, comprising:
applying a polymer layer over the second corrosion resistant metal coating.

18. The method of manufacturing a corrosion resistant tube of claim 15, comprising:
cold working the tubular body to a finished diameter, and annealing the tubular body after said cold working.

19. The method of manufacturing a corrosion resistant tube of claim 14, wherein said step of applying a corrosion resistant metal coating comprises:
applying said corrosion resistant metal coating to one of said top or bottom principal surfaces to a first thickness;
applying said corrosion resistant metal coating to the other of said top or bottom principal surfaces to a second thickness, said second thickness greater than said first thickness; and
orienting said strip so that the principal surface to which the corrosion resistant metal coating is applied to said second thickness forms the inside surface of said tubular body.

20. The method of manufacturing a corrosion resistant tube of claim 14, wherein said step of applying a corrosion resistant metal coating comprises:
applying a nickel coating to at least said top and bottom primary surfaces, and
heating the nickel coating to approximately the annealing temperature of the low carbon steel, causing the nickel coating to diffuse into the top and bottom primary surfaces of said strip, said nickel coating diffusing into the top and bottom primary surfaces to a depth of 1 micron or greater.

* * * * *